United States Patent
Hosono (10) Patent No.: US 9,065,342 B2
(45) Date of Patent: Jun. 23, 2015

(54) SWITCHING POWER SUPPLY AND ELECTRONIC DEVICE USING THE SAME

(75) Inventor: Hideaki Hosono, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 602 days.

(21) Appl. No.: 13/386,631

(22) PCT Filed: Jul. 24, 2009

(86) PCT No.: PCT/JP2009/063276
§ 371 (c)(1),
(2), (4) Date: Jan. 23, 2012

(87) PCT Pub. No.: WO2011/010388
PCT Pub. Date: Jan. 27, 2011

(65) Prior Publication Data
US 2012/0127760 A1    May 24, 2012

(51) Int. Cl.
H02M 3/335    (2006.01)

(52) U.S. Cl.
CPC ...... *H02M 3/33507* (2013.01); *H02M 3/33561* (2013.01)

(58) Field of Classification Search
CPC .................................................. H02M 3/335
USPC .......... 363/21.01, 21.04, 21.07, 21.12, 21.15, 363/97
See application file for complete search history.

(56) References Cited

U.S. PATENT DOCUMENTS

| | | | |
|---|---|---|---|
| 6,160,720 A | 12/2000 | Nishida et al. | |
| 6,252,783 B1 * | 6/2001 | Huh et al. | 363/21.01 |
| 2002/0036910 A1 * | 3/2002 | Yang | 363/21.07 |
| 2007/0024255 A1 * | 2/2007 | Yasumura | 323/267 |
| 2007/0176808 A1 | 8/2007 | Osaka | |

FOREIGN PATENT DOCUMENTS

| | | |
|---|---|---|
| JP | 3-113988 U | 11/1991 |
| JP | 3041842 B2 | 3/2000 |

(Continued)

OTHER PUBLICATIONS

International Search Report in PCT/JP2009/063276 dated Oct. 6, 2009 (English Translation Thereof).

Primary Examiner — Gary L Laxton
(74) Attorney, Agent, or Firm — McGinn IP Law Group, PLLC.

(57) ABSTRACT

A switching power supply includes: transformer 60 which includes a primary winding and a secondary winding and outputs, through the secondary winding, an AC voltage based on the current supplied to the primary winding; switching element 61 which controls current supply to the primary winding; rectifying/smoothing circuit 65 which converts the AC voltage output from the secondary winding into a DC voltage; voltage detecting circuit 62 which detects the DC voltage converted by rectifying/smoothing circuit 65; feedback amplifier 63 which is supplied with the DC voltage detected by voltage detecting circuit 62 as one input and which is supplied with a reference voltage as the other input, so as to output a difference between the input voltage values; and control circuit 64 which controls switching element 61, so as to eliminate the difference detected at feedback amplifier 63. Upon receipt of an instruction signal from the outside, voltage detecting circuit 62 supplies to feedback amplifier 63, a voltage higher than the voltage output before receipt of the instruction signal.

11 Claims, 3 Drawing Sheets

(56) References Cited

FOREIGN PATENT DOCUMENTS

| JP | 2000-278946 A | 10/2000 |
|---|---|---|
| JP | 2002-051561 A | 2/2002 |
| JP | 2003-033017 A | 1/2003 |
| JP | 2007-159305 A | 6/2007 |
| JP | 2007-195283 A | 8/2007 |
| JP | 2008-141895 A | 6/2008 |
| JP | 2009-050115 A | 3/2009 |

* cited by examiner

SWITCHING POWER SUPPLY AND ELECTRONIC DEVICE USING THE SAME

TECHNICAL FIELD

The present invention relates to a switching power supply and more particularly, to a switching power supply in which feedback control for stabilizing the output voltage of a transformer is performed.

BACKGROUND ART

Recently, there has been an increasing demand for a reduction in the power consumption of electric products from the viewpoint of global environmental protection. In response to such a demand, not only reducing the power consumption of electric products in normal operation but also reducing the standby power consumption thereof has become a critical issue. Here, normal operation refers to a state in which all of the functions that an electric product has are operable. A state at the time of standby (standby state) refers to a state in which only the function or functions necessary for the electric product to return to normal operation are active.

A trigger input for making a transition from a standby state to a normal operating state is activated by, for example, pressing down the power button of the electric product or receiving a control signal (power-on signal or the like) from a remote controller. During a standby time, most load circuits are in a pause state. Consequently, power consumption decreases to an extremely small value, for example, one several tenth to one several hundredth, compared with power consumption during normal operation.

Examples of switching power supplies capable of reducing the power loss of a primary-side circuit at light load include a resonance-type switching power supply described in Patent Document 1 (Patent 003041842B). This resonance-type switching power supply includes, on the primary side of a transformer, a DC power source, a switching element connected to the DC power source, and a control circuit for controlling the switching frequency of the switching element. In power-saving mode, it is possible to lower the supply voltage supplied to the control circuit and reduce power loss by lowering the switching frequency.

Patent Document 2 (JP2003-033017A) describes a switching power supply capable of saving the power of a secondary-side circuit during standby time.

This switching power supply includes, on the secondary side of a transformer, an output voltage detecting circuit for detecting the output voltage of the transformer, a detecting/rectifying circuit for detecting and rectifying a high-frequency voltage output from a secondary winding, a voltage level determining circuit for determining an output voltage level of the detecting/rectifying circuit, and a superposing circuit for superimposing a predetermined voltage on an input terminal of the output voltage detecting circuit on the basis of a result of determination made by the voltage level determining circuit. The switching power supply includes, on the primary side of a transformer, a switching element, and a control circuit for controlling the operation of the switching element on the basis of the difference between a voltage value detected by the output voltage detecting circuit and a reference voltage value.

If the voltage level detected by the voltage level determining circuit is lower than the predetermined voltage (in the case of light load), the superposing circuit superimposes the predetermined voltage on the input terminal of the output voltage detecting circuit. By varying the input voltage of the output voltage detecting circuit by the predetermined voltage, the switching element is caused to perform burst switching operation to reduce secondary-side power loss.

DISCLOSURE OF THE INVENTION

However, the switching power supplies described in Patent Documents 3 and 2 have the below-described problems.

In general, components used on the primary side of a switching power supply are required to have high-withstand voltage performance. High-withstand voltage components are bulky and the arrangement pitches of the components need to be made large from the viewpoint of safety.

In the switching power supply described in Patent Document 1, there is the need to provide, on the primary side of the transformer, a high-voltage resistance circuit for lowering the supply voltage supplied to the control circuit and for decreasing the switching frequency in the power-saving mode. As described above, the high-voltage resistance circuit is bulky and the arrangement pitches thereof need to be made large. Accordingly, adding the high-voltage resistance circuit to the primary side causes an increase in the size of the mounting area. Thus, a power supply unit becomes bulky and the weight thereof increases.

In addition, high-withstand voltage components are expensive, and therefore, the cost of the power supply unit increases.

The switching power supply described in Patent Document 2 does not require adding components on the primary side, but the voltage level determining circuit and the superposing circuit need to be provided on the secondary side. Thus, the cost of a power supply unit increases accordingly.

In addition to the above-described problems, such problems as described below are involved.

In general, if a load current becomes extremely small in feedback control in which the operation of a primary-side switching element is controlled on the basis of the detected value of a secondary-side output voltage, the switching element falls into an overdrive state. Consequently, excess energy is supplied to the secondary side, and therefore, the output voltage rises. During standby time, the load current sharply decreases, and therefore, feedback control does not work normally. Thus, the output voltage increases, and therefore, power consumption increases proportionally.

The switching power supply described in Patent Document 2 is configured to cause the switching element to perform switching operation intermittently in the state in which the input voltage of the output voltage detecting circuit is raised by a predetermined voltage, if the output voltage level of the detecting/rectifying circuit falls below a predetermined level. In this intermittent switching operation, it is difficult to prevent the above-described increase in power consumption since a voltage change when the load current sharply decreases cannot be detected.

An object of the present invention is to provide a low-cost small-size switching power supply capable of solving the above-described problems and efficiently reducing standby power consumption, and an electronic device that can use the switching power supply.

In order to achieve the above-described object, a switching power supply of the present invention includes:

a transformer including a primary winding and a secondary winding, so that an AC voltage based on a current supplied to the primary winding is output through the secondary winding;

a switching element which controls current supply to the primary winding;

a rectifying/smoothing circuit which converts the AC voltage output from the secondary winding to a DC voltage;

a voltage detecting circuit which detects the DC voltage converted by the rectifying/smoothing circuit;

a feedback amplifier which is supplied with the DC voltage detected by the voltage detecting circuit as one input and which supplied with a reference voltage as the other input, so as to output the difference between the values of these input voltages; and a control circuit which controls the switching element, so as to eliminate the difference detected at the feedback amplifier, wherein upon receipt of an instruction signal from the outside, the voltage detecting circuit supplies a voltage higher than the voltage output before receipt of the instruction signal, to the feedback amplifier.

In addition, an electronic device of the present invention includes:

a switching power supply;

an operating part; and a first control circuit which supplies a standby mode command signal to the switching power supply when receiving, from the operating part, a signal that indicates a transition from normal operation to standby mode in which power consumption is smaller than the normal operation, wherein the switching power supply includes:

a transformer including a primary winding and a secondary winding, so that an AC voltage based on a current supplied to the primary winding is output through the secondary winding;

a switching element which controls current supply to the primary winding;

a rectifying/smoothing circuit which converts the AC voltage output from the secondary winding to a DC voltage;

a voltage detecting circuit which detects the DC voltage converted by the rectifying/smoothing circuit;

a feedback amplifier which is supplied with the DC voltage detected by the voltage detecting circuit as one input and which is supplied with a reference voltage as the other input, so as to output the difference between the values of these input voltages; and a second control circuit which controls the switching element, so as to eliminate the difference detected at the feedback amplifier, and wherein upon receipt of a standby mode command signal from the outside, the voltage detecting circuit supplies a voltage higher than the voltage output before receipt of the standby mode command signal, to the feedback amplifier.

EXPLANATION OF REFERENCE NUMERALS

1 Variable-resistance Circuit
2 Resistor
3 DC Power Source
4, 63 Feedback Amplifier
5 Photocoupler
6, 9 Capacitor
7, 8 Diode
10, 60 Transformer
10a Primary Winding
10b, 10c Secondary Winding
11 Main Switching Circuit
12 Rectifying Bridge
13 Capacitor
61 Switching Element
Voltage Detecting Circuit
64 Control Circuit

MODES FOR CARRYING OUT THE INVENTION

Next, exemplary embodiments will be described with reference to the accompanying drawings.

Figure 1:
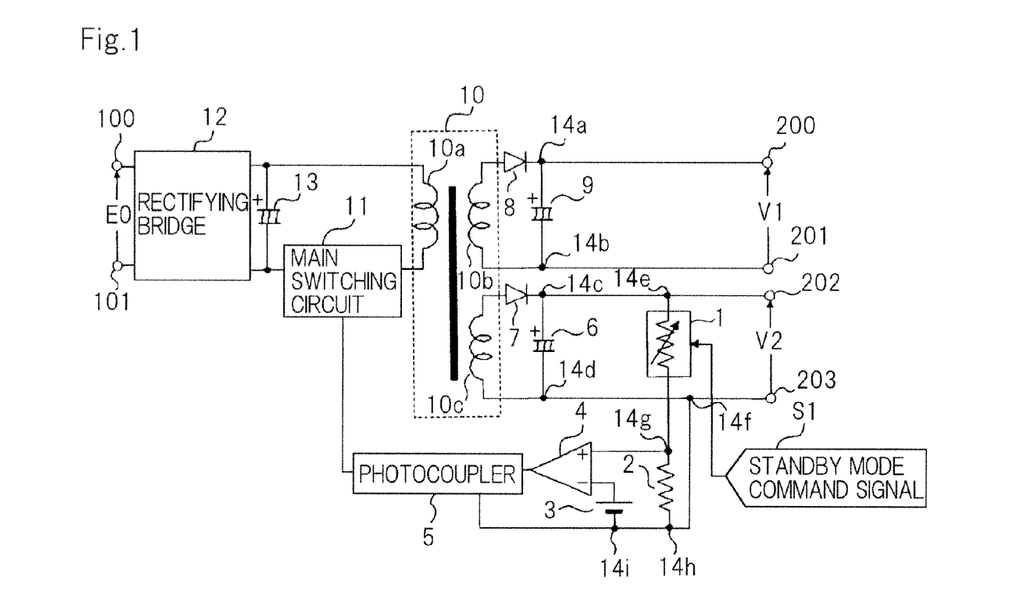
FIG. 1 is a block diagram illustrating a configuration of a switching power supply according to one exemplary embodiment.

FIG. 1 is a block diagram illustrating a configuration of a switching power supply according to one exemplary embodiment. Referring to FIG. 1, the switching power supply is a one-converter switching power supply having multiple outputs, and includes transformer 10 provided with primary winding 10a and secondary windings 10b and 10c.

Main switching circuit 11, rectifying bridge 12 and capacitor 13 are provided on the primary side of transformer 10.

Rectifying bridge 12 is a bridge-type rectifying circuit including of four diodes. Two input lines of rectifying bridge 12 are connected to input terminals 100 and 101, respectively. One output line (positive polarity-side line) of the two output lines of rectifying bridge 12 is connected to one end of primary winding 10a and the other output line (negative polarity-side line) is connected to the other end of primary winding 10a through main switching circuit 11.

Capacitor 13 is connected between the two output lines of rectifying bridge 12. Rectifying bridge 12 and capacitor 13 constitute a rectifying/smoothing circuit.

Main switching circuit 11 includes a switching element (MOSFET or the like) for controlling current supply to the primary winding and a control circuit for on/off-controlling this switching element. The control circuit controls the operation of the switching element according to a feedback control signal.

Variable-resistance circuit 1, resistor 2, DC power source 3, feedback amplifier 4, photocoupler 5, capacitors 6 and 9, and diodes 7 and 8 are provided on the secondary side of transformer 10. Resistor 2 is a resistive element having a fixed resistance value.

One end of secondary winding 10b is connected to node 14a through diode 8, and the other end of secondary winding 10b is connected to node 14b. Node 14a is connected to output terminal 200, and node 14b is connected to output terminal 201. One end of capacitor 9 is connected to node 14a, and the other end of capacitor 9 is connected to node 14b. Secondary winding 10b outputs an AC voltage based on a current supplied to primary winding 10a. Diode 8 and capacitor 9 form a rectifying/smoothing circuit for converting an AC voltage output from secondary winding 10b into a DC voltage.

One end of secondary winding 10c is connected to node 14c through diode 7, and the other end of secondary winding 10c is connected to node 14d. Node 14c is connected to node 14e, and node 14e is connected to output terminal 202. Node 14d is connected to node 14f, and node 14f is connected to output terminal 203. One end of capacitor 6 is connected to node 14c, and the other end of capacitor 6 is connected to node 14d. Secondary winding 10c outputs an AC voltage based on a current supplied to primary winding 10a. Diode 7 and capacitor 6 form a rectifying/smoothing circuit for converting an AC voltage output from secondary winding 10c into a DC voltage.

One terminal of variable-resistance circuit 1 is connected to node 14e, and the other terminal of variable-resistance circuit 1 is connected to node 14g. Node 14g is connected to one input terminal (+side) of feedback amplifier 4 and to one end of resistor 2. The other end of resistor 2 is connected to node 14h.

Node 14h is connected to node 14i and node 14f. Node 14i is connected to the other input terminal (−side) of feedback amplifier 4 through DC power source 3 and to a GND-side terminal of photocoupler 5. The output of feedback amplifier 4 is supplied to main switching circuit 11 through photocoupler 5.

DC power source 3 and feedback amplifier 4 constitute a shunt regulator. Variable-resistance circuit 1 and resistor 2 constitute a voltage detecting circuit for detecting output voltage V2 generated between output terminals 202 and 203. The resistance value of variable-resistance circuit 1 changes according to standby mode command signal S1 from a device to which power is supplied.

The other input terminal (negative polarity side) of feedback amplifier 4 is connected to DC power source 3 for supplying a reference voltage. Feedback amplifier 4 takes the difference between the value of a voltage supplied to one input terminal (positive polarity side) and the value of a reference voltage supplied to the other input terminal (negative polarity side), amplifies the difference value, and outputs the amplified difference value as a feedback control signal (signal indicating a change in secondary-side output voltage V2). The voltage supplied to the one input terminal (positive polarity side) of feedback amplifier 4 is a divided voltage dependent on the ratio between the respective resistance values of variable-resistance circuit 1 and resistor 2.

The feedback control signal from feedback amplifier 4 is supplied to main switching circuit 11 through photocoupler 5. In a system in which a change in the secondary-side output voltage is fed back to main switching circuit 11 on the primary side, photocoupler 5 is used to isolate the voltage detecting circuit and main switching circuit 11 from each other.

Note that in FIG. 1, a primary-side circuit is illustrated in a simplified manner since the circuit is similar to a regular switching power supply.

The switching power supply of the present exemplary embodiment is provided with two output lines having output voltages V1 and V2 on the secondary side of transformer 10. The switching power supply includes a voltage detecting circuit (variable-resistance circuit 1 and resistor 2) for detecting the output voltage in one output line (output voltage V2). Feedback amplifier 4 supplies a feedback control signal indicating the difference between the value of a voltage detected by the voltage detecting circuit of feedback amplifier 4 and the value of a reference voltage to main switching circuit 11 through photocoupler 5.

In main switching circuit 11, the control circuit controls the operation of the switching element according to the input feedback control signal. A high-frequency pulse current according to the switching frequency of the switching element is supplied to primary winding 10a.

In a PWM (Pulse Width Modulation) system, for example, the control circuit controls the width of a driving pulse of the switching element (ratio between the on-period and off-period of the switching element) according to the input feedback control signal. Consequently, the switching frequency of the switching element changes according to a change in output voltage V2. By this switching control based on the input feedback control signal, output voltage V2 is kept constant irrespective of the increase or decrease of the output current. Output voltage V1 is also kept constant.

In an RCC (Ringing Choke Convertor) system, the positive polarity-side line connected to one end of primary winding 10a is connected to a control terminal of the switching element through a starting resistor, and the other end of primary winding 10a is connected to the negative polarity-side line through the switching element. When the switching element is in an on-period, a current flows through primary winding 10a and thus electromagnetic energy is accumulated. When the switching element is turned off, the accumulated electromagnetic energy is supplied to the secondary side through secondary windings 10b and 10c. The control circuit on/off-controls the switching element according to the input feedback control signal. By this switching control based on the input feedback control signal, output voltages V1 and V2 can be kept constant irrespective of the increase or decrease of the output current.

Upon receipt of standby mode command signal S1, variable-resistance circuit 1 changes its own resistance value, in order to lower output voltage V2. Specifically, upon receipt of standby mode command signal S1, variable-resistance circuit 1 makes its own resistance value smaller than a resistance value (resistance value at the time of normal operation) before receipt of standby mode command signal S1. Consequently, output voltage V2 becomes lower.

Figure 2:
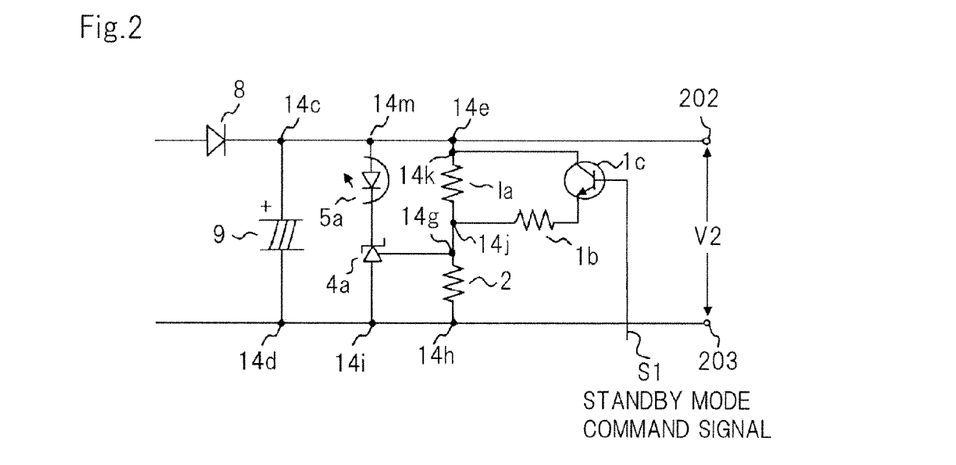
FIG. 2 is a circuit diagram illustrating a configuration of a variable-resistance circuit of the switching power supply illustrated in FIG. 1.

FIG. 2 illustrates one example of variable-resistance circuit 1. Variable-resistance circuit 1 includes resistors 1a and 1b and transistor 1c. One end of resistor 1a is connected to node 14k, and the other end of resistor 1a is connected to node 14j.

Node 14k is connected to node 14e and to the collector of transistor 1c. The emitter of transistor 1c is connected to node 14j through resistor 1b. Standby mode command signal 5 is supplied to the base of transistor 1c. Node 14j is connected to node 14g.

In addition, in FIG. 2, shunt regulator 4a is an error amplifier having a reference voltage incorporated therein and includes DC power source 3 and feedback amplifier 4 illustrated in FIG. 1. Shunt regulator 4a operates so that a voltage supplied to a reference terminal connected to node 14g equals the reference voltage. The cathode of shunt regulator 4a is connected to a diode constituting photocoupler 5.

In the configuration illustrated in FIG. 2, transistor 1c is placed in an off-state at the time of normal operation. In this case, the resistance value of variable-resistance circuit 1 agrees with the resistance value of resistor 1a. Accordingly, a divided voltage dependent on the ratio between the resistance values of resistor 2 and resistor 1a is supplied to the reference terminal of shunt regulator 4a.

In standby mode, transistor 1c goes to an on-state. In this case, the resistance value of variable-resistance circuit 1 agrees with the combined resistance value of resistors 1a and 1b. Accordingly, a divided voltage dependent on the ratio between the combined resistance value of resistors 1a and 1b and the resistance value of resistor 2 is supplied to the reference terminal of shunt regulator 4a.

The resistance value (combined resistance value of resistors 1a and 1b) of variable-resistance circuit 1 in standby mode is smaller than the resistance value (resistance value of resistor 1a) of variable-resistance circuit 1 in normal operation. As described above, in standby mode, output voltage V2 obtained by feedback control with shunt regulator 4a can be lowered by forcibly lowering the resistance value of variable-resistance circuit 1.

Next, the operation of a switching power supply according to the present exemplary embodiment in an electronic device provided with the switching power supply will be described specifically.

Figure 3:
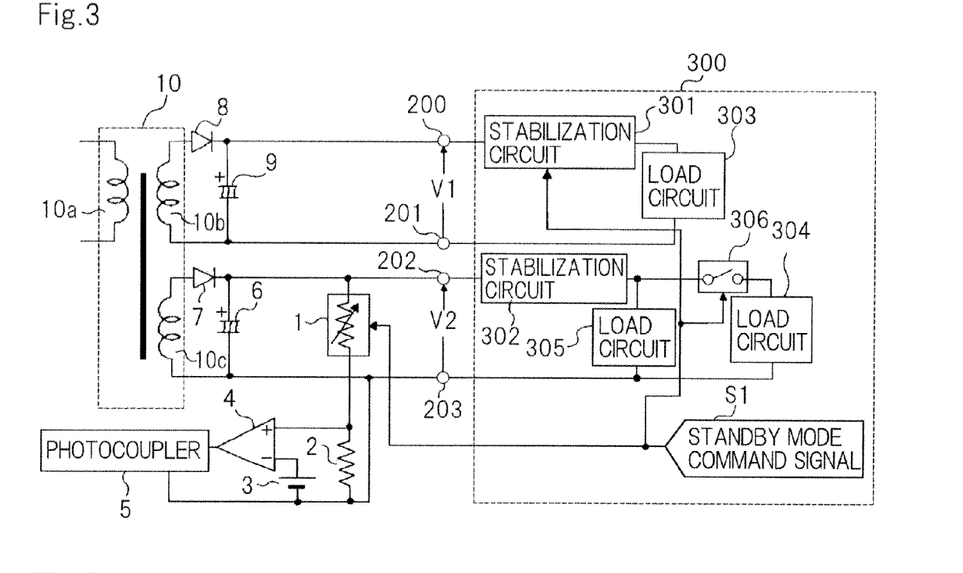
FIG. 3 is a block diagram illustrating a configuration of the switching power supply illustrated in FIG. 1 and main load circuits of an electronic device connected to the switching power supply.

FIG. 3 illustrates the configuration of the switching power supply according to the present exemplary embodiment and main circuits (loads) of the electronic device connected to the switching power supply. Referring to FIG. 3, electronic device 300 is a device, such as a liquid crystal display, a projector or a recorder, having standby mode. The principal part of the electronic device includes of stabilization circuits 301 and 302, load circuits 303 to 305, and switch 306.

Output terminals 200 and 201 (output voltage V1) of the switching power supply are connected to load circuit 303. Load circuit 303 is, for example, a drive circuit of a liquid crystal panel. Output voltage V1 is, for example, approximately 20 V. The load current of the switching power supply is basically constant, independent of the content of a video signal and the like.

Stabilization circuit 301 is provided in the positive polarity-side line connecting output terminal 200 and load circuit 303. Stabilization circuit 301 is, for example, a three-terminal regulator. Stabilization circuit 301 is adapted to cause the output thereof to be cut off during a period in which stabilization circuit 301 is receiving standby mode command signal S1. That is, since loads for output voltage V1 are rejected in a period in which standby mode is set, power consumption in load circuit 303 is reduced to zero.

Load circuits 304 and 305 are respectively parallel-connected to the output lines (output voltage V2) of output terminals 202 and 203 of the switching power supply. Stabilization circuit 302 is provided in the positive polarity-side line of output terminal 202. The output of stabilization circuit 302 is supplied to load circuit 305 and to load circuit 304 through switch 306. Output voltage V2 is, for example, approximately 5 V. The load current of the switching power supply varies greatly, depending on the content of a video signal and the like.

Switch 306 is placed in an on-state at the time of normal operation. In standby mode, standby mode command signal S1 is supplied to switch 306. Switch 306 is in an off-state during a period in which switch 306 is receiving standby mode command signal S1.

Load circuit 304 is a video signal processing circuit, a control circuit of apparatus as a whole, or the like. Load circuit 305 is a circuit necessary to return from standby mode to normal operation mode, and operates in both normal operation mode and standby mode. Load circuit 305 includes, for example, a drive circuit for creating a display showing the standby mode by using a display device, such as LED, and a control circuit for performing mode recovery processing to return to normal operation mode upon receipt of an input signal from a remote control signal receiving circuit or a button operating part.

In load circuit 305, the control circuit outputs standby mode command signal S1 upon receipt of a signal indicating a transition from normal operation mode to standby mode from the remote control signal receiving circuit or the button operating part. In addition, this control circuit stops outputting standby mode command signal S1 upon receipt of a signal indicating a transition from standby mode to normal operation mode from the remote control signal receiving circuit or the button operating part.

In the configuration illustrated in FIG. 3, the control circuit included in load circuit 305, when instructed to make a transition to standby mode by button operation or by remote controller operation, outputs standby mode command signal S1. Standby mode command signal S1 is supplied to stabilization circuit 301, switch 306, and variable-resistance circuit 1 illustrated in FIG. 1.

In response to standby mode command signal S1, stabilization circuit 301 stops and switch 306 goes to an off-state. Consequently, voltage supply to load circuits 303 and 304 stops.

In addition, when standby mode command signal S1 is supplied to variable-resistance circuit 1, the resistance value of variable-resistance circuit 1 becomes smaller than the resistance value (resistance value at the time of normal operation) before receipt of standby mode command signal S1. As a result, output voltage V2 becomes lower.

The control circuit included in load circuit 305, when instructed to make a transition from standby mode to normal operation mode by button operation or by remote controller operation, stops outputting standby mode command signal S1. Consequently, voltage supply from stabilization circuit 301 to load circuit 303 is initiated. In addition, switch 306 goes to an on-state and voltage supply from stabilization circuit 302 to load circuit 304 is initiated.

If supply of standby mode command signal S1 to variable-resistance circuit 1 stops, the resistance value of variable-resistance circuit 1 changes to the abovementioned resistance value at the time of normal operation. As a result, output voltage V2 rises.

Figure 4:
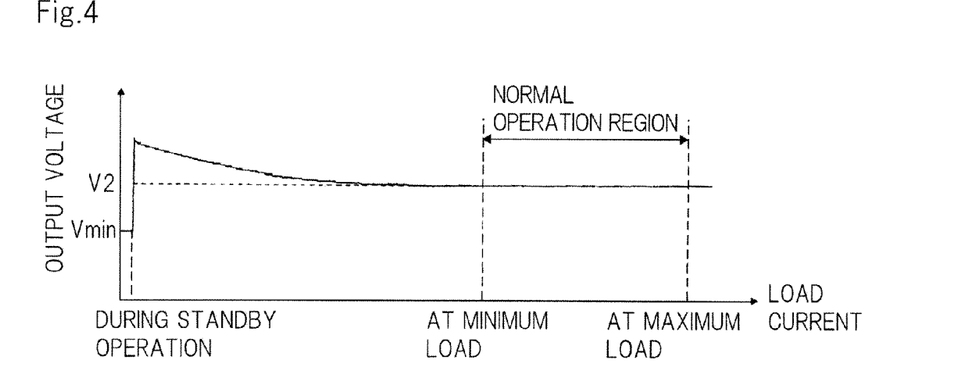
FIG. 4 is a characteristic drawing illustrating the relationship between a load current and an output voltage in the switching power supply illustrated in FIG. 1, when the resistance value of the variable-resistance circuit is varied in normal operation and in standby mode.
Figure 5:
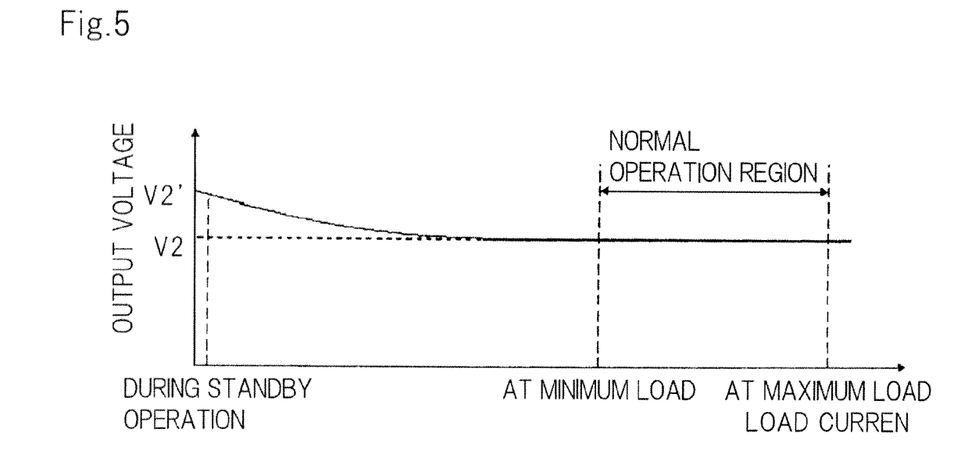
FIG. 5 is a characteristic drawing illustrating the relationship between a load current and an output voltage in a switching power supply which is a comparative example, when the resistance value of the variable-resistance circuit is varied in normal operation and in standby mode.

FIG. 4 illustrates the relationship between a load current and the output voltage when the resistance value of variable-resistance circuit 1 is varied in normal operation and in standby mode. In addition, as a comparative example of the relationship, FIG. 5 illustrates the relationship between the load current and the output voltage when the resistance value of variable-resistance circuit 1 is kept constant. Note that the configuration in which the resistance value of variable-resistance circuit 1 is kept constant corresponds to, for example, the configuration in which variable-resistance circuit 1 is comprised only of resistor 1a illustrated in FIG. 2.

In FIGS. 4 and 5, the axis of ordinates represents the value of the output voltage and the axis of abscissas represents the value of the load current. The value of the output voltage is a voltage value obtained by feedback control. The output voltage value at the time of normal operation is retained at "V2". "NORMAL OPERATION REGION" refers to a variation range of the load current (range defined by "AT MINIMUM LOAD" and "AT MAXIMUM LOAD") at the time of normal operation. The load current in standby mode is made smaller in value than the load current at the time of "DURING STANDBY OPERATION."

Here, "NORMAL OPERATION REGION" defines the variation range of a load under the condition in which, for example, video images are displayed and audio sounds are output in TV (television). "AT MINIMUM LOAD" corresponds to a condition in which no video signals are input, the brightness level of a screen is set low, the output level of audio sounds is set to a minimum value, or the like. "AT MAXIMUM LOAD" corresponds to a condition in which video images based on high-resolution Hi-Vision video signals are displayed, the brightness level of a screen is set high, the output level of audio sounds is set to a maximum value, or the like.

In the example illustrated in FIG. 5, the resistance value of variable-resistance circuit 1 is fixed. At the time of normal operation, the output voltage value is retained at "V2" by feedback control, irrespective of the magnitude of the load current. Accordingly, the switching power supply operates as a stabilized power supply.

In standby mode, the value of the load current is extremely small, compared with the load current value of "NORMAL OPERATION REGION." If the load current value is extremely small, main switching circuit 11 falls into an overdrive state, and therefore, feedback control no longer works normally. In this case, the switching power supply does not operate as a stabilized power supply. Consequently, excess energy is supplied to the secondary side, thus causing the output voltage to rise. In addition, the switching power supply is generally designed taking into consideration the winding resistance and circuit resistance (pattern, harness, and the like) of a transformer, so that the output voltage does not fall below a minimum voltage at a maximum current. Accordingly, the voltage rises due to resistance components in standby mode in which the load current is minimum. For such reasons, the output voltage increases to "V2'" larger than "V2" in standby mode.

Also in the example illustrated in FIG. 4, the value of the load current becomes extremely small in standby mode, compared with the load current value of "NORMAL OPERATION REGION." In standby mode, however, the resistance value of variable-resistance circuit 1 is set to a second resistance value smaller than a first resistance value set at the time of normal operation. As the result of the resistance value of variable-resistance circuit 1 being set to the second resistance value, the output voltage value obtained by feedback control equals "Vmin" (<"V2").

Here, the voltage value "Vmin" refers to the value of a minimum voltage necessary for load circuit 305 illustrated in FIG. 3 to operate. Load circuit 305 includes functions, such as an LED drive circuit, a remote control signal receiving circuit, and a circuit for detecting the pressing down of buttons of an apparatus, which are necessary to cause the apparatus to return from the standby mode to the normal operation mode. In this load circuit 305, only those functions which are necessary to cause the apparatus to return from standby mode to normal operation mode work. Accordingly, the operating voltage of control circuit (CPU) can be set lower than the voltage at the time of normal operation (i.e., voltage V2).

The value of output voltage "V2" is the voltage value that is necessary for load circuits 303 and 304 illustrated in FIG. 3 to operate. Load circuit 304 includes a video signal processing circuit and the like and is, therefore, assigned with a supply voltage that is necessary to secure a predetermined operating speed. The value of this supply voltage corresponds to the value of output voltage "V2."

Next, the effect of reducing power consumption in standby mode in the switching power supply of the present exemplary embodiment will be described with reference to the examples illustrated in FIGS. 4 and 5.

In the example illustrated in FIG. 5, the value of the output voltage in the standby mode is "V2'" (>V2). Power consumption P' in this case is given by $$P'=Ia \times V2'$$

where Ia is the load current value of load circuit 305.

On the other hand, in the example illustrated in FIG. 4 (switching power supply of the present exemplary embodiment), the value of an output voltage in standby mode is "Vmin" (<V2). Power consumption P in this case is given by $$P=Ia \times V\text{min}$$

Difference ΔP between this power consumption P and power consumption P' in the example illustrated in FIG. 5 is $$\Delta P=P-P'=Ia \times (VT-V\text{min})$$

According to the example illustrated in FIG. 4 (switching power supply of the present exemplary embodiment), power consumption in the standby mode can be reduced by ΔP noted above, compared with the example illustrated in FIG. 5.

According to the switching power supply of the present exemplary embodiment, such an effect as described below can also be attained, in addition to the above-described effect of reduction in standby power consumption.

The switching power supply of the present exemplary embodiment can be embodied simply by changing the secondary-side configuration (specifically, simply by providing variable-resistance circuit 1 for constituting a voltage detecting circuit and wiring or the like for supplying standby mode command signal S1 to variable-resistance circuit 1) in an existing switching power supply. In general, the withstand voltage performance of secondary-side circuit components is low, compared with that of primary-side circuit components. Accordingly, the switching power supply of the present exemplary embodiment can be embodied using components low in withstand voltage performance, i.e., inexpensive, small, lightweight components.

The above-described switching power supply of the present exemplary embodiment is only one example of the present invention. Accordingly, the configuration of the switching power supply can be changed as appropriate, without departing from the gist of the present invention.

For example, although in the configuration illustrated in FIG. 1, the voltage detecting circuit is comprised of variable-resistance circuit 1 and resistor 2, a resistive element having a fixed resistance value may be used in place of variable-resistance circuit 1 and a variable-resistance circuit may be used in place of resistor 2. In this case, in the variable-resistance circuit, a first resistance value is set at the time of normal operation and, upon receipt of standby mode command signal S1, a second resistance value larger than the first resistance value is set.

The above-described variable-resistance circuit can be realized by, for example, deleting transistor 1c and connecting the other end of resistor 1b, one end of which is connected to node 14j, to node 14h through switch means in the configuration illustrated in FIG. 2. The switch means is placed in an off-state during a period in which standby mode command signal S1 is supplied, and is placed in an on-state in periods other than that period. A MOSFET, for example, is used as the switch means.

In addition, although in the configuration illustrated in FIG. 1, transformer 10 including two secondary windings 10b and 10c is used, the number of secondary windings is not limited to two. Alternatively, the number of secondary windings may be one or three or more. If the number of secondary windings is one, the configuration is changed such that a circuit on the secondary winding 10b side illustrated in FIG. 1 is deleted. If the number of secondary windings is three or more, the configuration on the secondary winding 10c side illustrated in FIG. 1 is applied to one of the secondary windings.

In addition, in the configuration illustrated in FIG. 3, load circuit 305 may be connected to an output line on the output voltage V1 side on which feedback control is not performed. If the voltage on the output voltage V2 side stabilized by feedback control is lowered, the voltage on the output voltage V1 side on which feedback control is not performed will also become lower at the same rate. Thus, the same effect as that available on the output voltage V2 side can be attained.

In addition, if the output voltage of the output line on the side on which load circuit 305 is connected is lowered, the output voltage of the other output line will also become lower. Thus, as components to be connected to the other output line, components low in withstand voltage can be used. That is, it is possible to adopt inexpensive, small, lightweight components.

(Another Exemplary Embodiment)

Figure 6:
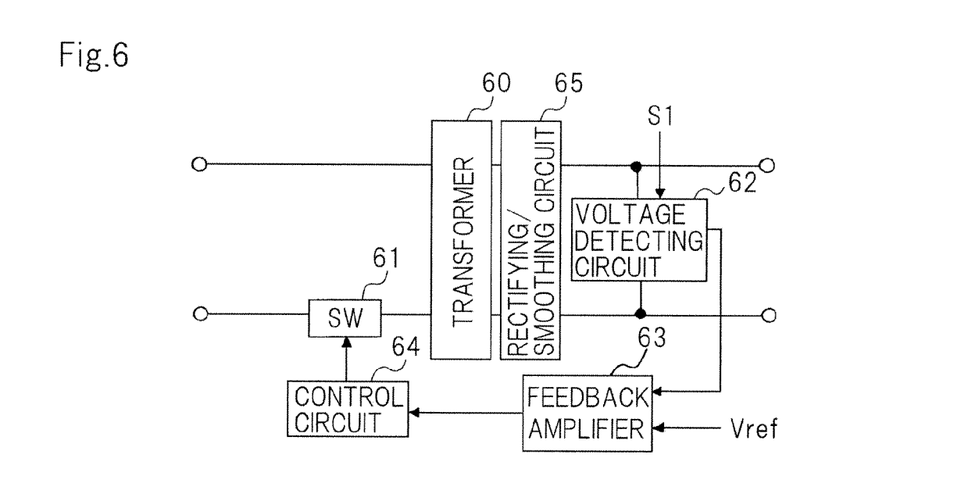
FIG. 6 is a block diagram illustrating a configuration of a switching power supply according to another exemplary embodiment.

FIG. 6 is a block diagram illustrating a configuration of a switching power supply according to another exemplary embodiment.

Referring to FIG. 6, the switching power supply includes transformer 60, switching element 61, voltage detecting circuit 62, feedback amplifier 63, control circuit 64, and rectifying/smoothing circuit 65.

Transformer 60 is provided with a primary winding and a secondary winding, and an AC voltage based on current supplied to the primary winding is output through the secondary winding. Rectifying/smoothing circuit 65 converts the AC voltage output from the secondary winding into a DC voltage.

Switching element 61 controls current supply to the primary winding of transformer 60. Voltage detecting circuit 62 detects the DC voltage converted by rectifying/smoothing circuit 65. Feedback amplifier 63 is supplied with the DC voltage being detected by voltage detecting circuit 62 as one input and being supplied with a reference voltage as the other input, so as to output the difference between the values of these input voltages.

Control circuit 64 controls switching element 61, so as to eliminate the difference detected at feedback amplifier 63.

Upon receipt of an instruction signal (standby mode command signal S1) from the outside, voltage detecting circuit 62 supplies a voltage higher than the voltage output before receipt of the instruction signal to feedback amplifier 63. Consequently, the output voltage of rectifying/smoothing circuit 65 becomes lower, and therefore, power consumption in standby mode can be reduced accordingly.

In the switching power supply of the present another exemplary embodiment, voltage detecting circuit 62 may include a series circuit in which a variable-resistance circuit and a resistive element having a fixed resistance value are connected in series. In this case, the series circuit is connected in parallel between output lines connected to the secondary winding, and a divided voltage dependent on the ratio between the respective resistance values of the variable-resistance circuit and the resistive element is supplied to one input of feedback amplifier 63. Upon receipt of the instruction signal (standby mode command signal S1), the ratio between the respective resistance values of the series circuit varies.

In the above-described configuration, the variable-resistance circuit may be connected to a positive polarity-side line of the output lines. In addition, a first resistance value may be set in the variable-resistance circuit during a period in which the instruction signal is received, and a second resistance value larger than the first resistance value may be set during periods other than that period.

Alternatively, the variable-resistance circuit may be connected to a negative polarity-side line of the output lines. In addition, a first resistance value may be set in the variable-resistance circuit during a period in which the instruction signal is received, and a second resistance value smaller than the first resistance value may be set during periods other than that period.

According to the switching power supply of the present another exemplary embodiment, it is possible to efficiently reduce standby power consumption.

In addition, the switching power supply of the present another exemplary embodiment can be embodied by changing the configuration of voltage detecting circuit 62 on the secondary side and providing wiring for supplying standby mode command signal S1 in an existing switching power supply. Accordingly, it is possible to reduce the cost and size of the switching power supply, compared with those described in Patent Documents 1 and 2.

The invention claimed is:

1. A switching power supply comprising:
   a transformer including a primary winding and a secondary winding, so that an AC voltage based on a current supplied to the primary winding is output through the secondary winding;
   a switching element which controls current supply to the primary winding;
   a rectifying/smoothing circuit which converts the AC voltage output from the secondary winding to a DC voltage;
   a voltage detecting circuit which detects the DC voltage converted by said rectifying/smoothing circuit;
   a feedback amplifier which is supplied with the DC voltage detected by said voltage detecting circuit as one input and which supplied with a reference voltage as the other input, so as to output a difference between values of these input voltages; and
   a control circuit which controls said switching element, so as to eliminate the difference detected at said feedback amplifier,
   wherein upon receipt of an instruction signal from an external apparatus, said voltage detecting circuit supplies a voltage higher than a voltage output before receipt of the instruction signal, to said feedback amplifier, and
   wherein said voltage detecting circuit includes a series circuit in which a variable-resistance circuit and a resistive element whose resistance value is fixed are connected in series, the series circuit is connected in parallel between output lines connected to the secondary winding, a divided voltage according to a ratio between the respective resistance values of the variable-resistance circuit and the resistive element is supplied to one input of said feedback amplifier, and the ratio between the respective resistance values varies upon receipt of the instruction signal.

2. The switching power supply according to claim 1, wherein the variable-resistance circuit is connected to a positive polarity-side line of the output lines, a first resistance value is set during a period in which the instruction signal is received, and a second resistance value larger than the first resistance value is set during periods other than that period.

3. The switching power supply according to claim 1, wherein the variable-resistance circuit is connected to a negative polarity-side line of the output lines, a first resistance value is set during a period in which the instruction signal is received, and a second resistance value smaller than the first resistance value is set during periods other than that period.

4. The switching power supply according to claim 1, further comprising:
   at least one further secondary winding which outputs an AC voltage based on a current supplied to the primary winding; and another rectifying/smoothing circuit which converts the AC voltage output from said further secondary winding to a DC voltage.

5. The switching power supply according to claim 2, further comprising:
at least one further secondary winding which outputs an AC voltage based on a current supplied to the primary winding; and
another rectifying/smoothing circuit which converts the AC voltage output from said further secondary winding to a DC voltage.

6. The switching power supply according to claim 3, further comprising:
at least one further secondary winding which outputs an AC voltage based on a current supplied to the primary winding; and
another rectifying/smoothing circuit which converts the AC voltage output from said further secondary winding to a DC voltage.

7. An electronic device, comprising:
a switching power supply;
an operating part; and
a first control circuit which supplies a standby mode command signal to said switching power supply when receiving, from said operating part, a signal that indicates a transition from normal operation to standby mode in which power consumption is smaller than the normal operation,
wherein said switching power supply includes:
a transformer including a primary winding and a secondary winding, so that an AC voltage based on a current supplied to the primary winding is output through the secondary winding;
a switching element which controls current supply to the primary winding;
a rectifying/smoothing circuit which converts the AC voltage output from the secondary winding to a DC voltage;
a voltage detecting circuit which detects the DC voltage converted by said rectifying/smoothing circuit;
a feedback amplifier which is supplied with the DC voltage detected by said voltage detecting circuit as one input and which is supplied with a reference voltage as the other input, so as to output a difference between values of these input voltages; and
a second control circuit which controls said switching element, so as to eliminate the difference detected at said feedback amplifier,
wherein upon receipt of a standby mode command signal from an external apparatus, said voltage detecting circuit supplies a voltage higher than a voltage output before receipt of the standby mode command signal, to said feedback amplifier, and
wherein said voltage detecting circuit includes a series circuit in which a variable-resistance circuit and a resistive element whose resistance value is fixed are connected in series, the series circuit is connected in parallel between output lines connected to the secondary winding, a divided voltage according to a ratio between respective resistance values of the variable-resistance circuit and the resistive element is supplied to one input of said feedback amplifier, and the ratio between the respective resistance values varies upon receipt of the standby mode command signal.

8. The electronic device according to claim 7, wherein the variable-resistance circuit is connected to a positive polarity-side line of the output lines.

9. The electronic device according to claim 7, wherein a first resistance value is set during a period in which the standby mode command signal is received, and a second resistance value larger than the first resistance value is set during periods other than the period.

10. The electronic device according to claim 7, wherein the variable-resistance circuit is connected to a negative polarity-side line of the output lines.

11. The electronic device according to claim 7, wherein a first resistance value is set during a period in which the standby mode command signal is received, and a second resistance value smaller than the first resistance value is set during periods other than the period.

* * * * *